United States Patent [19]

Nishimura et al.

[11] Patent Number: 5,766,393

[45] Date of Patent: Jun. 16, 1998

[54] PROCESS FOR SEALING AN END FACE OF A CERAMIC HONEYCOMB STRUCTURE

[75] Inventors: Koji Nishimura; Yasuo Imamura, both of Omuta, Japan

[73] Assignee: Denki Kagaku Kogyo Kabushiki Kaisha, Tokyo, Japan

[21] Appl. No.: 669,809

[22] Filed: Jun. 27, 1996

[30] Foreign Application Priority Data

Jul. 6, 1995 [JP] Japan ................................ 7-171080

[51] Int. Cl.⁶ ........................ B32B 31/12; C04B 35/565
[52] U.S. Cl. ...................... 156/89; 156/155; 156/230; 264/610; 264/630; 264/682
[58] Field of Search ................................ 156/155, 230, 156/293, 89, 277; 264/41, 59, 610, 630, 682; 55/523

[56] References Cited

U.S. PATENT DOCUMENTS

| | | | |
|---|---|---|---|
| 4,428,758 | 1/1984 | Montierth | 55/523 |
| 4,432,918 | 2/1984 | Paisley | 264/43 |
| 4,557,962 | 12/1985 | Belmonte et al. | |
| 4,559,193 | 12/1985 | Ogawa et al. | |
| 4,563,414 | 1/1986 | Ogawa et al. | |
| 4,576,774 | 3/1986 | Hazard et al. | 264/267 |
| 4,840,827 | 6/1989 | Mizutani et al. | 156/89 X |
| 5,433,904 | 7/1995 | Noky | 264/59 X |

FOREIGN PATENT DOCUMENTS

| | | |
|---|---|---|
| 0 042 302 | 12/1981 | European Pat. Off. |
| 0 070 202 | 1/1983 | European Pat. Off. |
| 0 073 634 | 3/1983 | European Pat. Off. |
| 0 295 343 | 12/1988 | European Pat. Off. |

*Primary Examiner*—Curtis Mayes
*Attorney, Agent, or Firm*—Oblon, Spivak, McClelland, Maier & Neustadt, P.C.

[57] ABSTRACT

A process for sealing an end face of a ceramic honeycomb structure includes introducing an expansive material which can be burned off, into through-holes not to be sealed, among through-holes of the honeycomb structure, expanding the expansive material to temporarily seal the through-holes not to be sealed, at their ends, filling a sealant into ends of through-holes to be sealed, and burning off the expansive material and sintering the sealant at the same time.

16 Claims, 3 Drawing Sheets

PROCESS FOR SEALING AN END FACE OF A CERAMIC HONEYCOMB STRUCTURE

BACKGROUND OF THE INVENTION

1. Field of the Invention

The present invention relates to a process for sealing an end face of a ceramic honeycomb structure. Particularly, it relates to a process for sealing predetermined through-holes among a plurality of through-holes of a ceramic honeycomb structure, at their ends, which is a process particularly suitable for sealing of a ceramic honeycomb structure wherein the opening area of through-holes is small.

2. Discussion of the Background

In the fields of automobiles and domestic electrical appliances, ceramic honeycomb structures (hereinafter sometimes referred to simply as "honeycomb") are presently widely used. In particular, in the field of automobiles, a diesel particulate filter (hereinafter referred as "DPF") is used which collects fine particles discharged from a diesel engine. This DPF has a plurality of through-holes parallel to the moving direction of the exhaust gas. At one end face, every other through-holes are sealed to form a checkered pattern, and at the other end face, the rest of through-holes are sealed, so that the through-holes are alternately sealed at either one of the end faces. Therefore, exhaust gas entered into through-holes (X) from one end face (A) of the honeycomb will pass through the porous wall of the through-holes to the adjacent other through-holes (Y), since the other end face (B) of the through-holes (X) is sealed. The through-holes (Y) are sealed at one end face (A) and are open at the other end face (B). Therefore, the exhaust gas will be discharged from the openings. Here, fine particles in the exhaust gas will be collected and accumulate on the porous wall surface. In recent years, improvement of this collecting efficiency is desired, and there is a trend to use a honeycomb having a high specific surface area at the collecting portion i.e. having a larger number of through-holes with a small opening area formed.

Such a honeycomb is produced by molding a mixed material comprising a ceramic powder such as cordierite, mullite, alumina or silicon carbide, an organic binder and water as a dispersing medium, into a honeycomb form, for example, by extrusion molding, followed by drying, and then alternately sealing through-holes of this molded product at both end faces, followed by heating and calcining.

Heretofore, many proposals have been made with respect to the method of sealing the end faces of the honeycomb. For example, Japanese Unexamined Patent Publications No. 7215/1982 (U.S. Pat. No. 4,293,357) and No. 37480/1983 (U.S. Pat. Nos. 4,557,773 and 4,573,896) disclose a method wherein a film or the like is bonded to the end face of the honeycomb and then holes are formed in the film at portions corresponding to the through-holes to be sealed, or a film having such holes preliminarily formed, is bonded to the end face of the honeycomb, and then a sealing material is introduced through these holes into the through-holes for sealing.

In such a method, in order to introduce the sealant into only the through-holes to be sealed, the size of holes for introducing the sealant, to be formed in the film, must be equal or smaller than the opening area of the through-holes to be sealed. On the other hand, in order to facilitate the introduction of the sealant, such holes are desired to be as large as possible, i.e. to be equal to the opening area of the through-holes. However, it is very difficult to form in the film such holes having a size equal to the opening area of the through-holes, since accurate dimensional precision is thereby required, and substantial labor and time will be required for such an operation. Accordingly, in the practical operation, the holes to be formed in the film tend to be smaller than the opening area of the through-holes, and especially in the case of a honeycomb having through-holes with a small opening area, the size of holes in the film is about 50% of the opening area of the through-holes, at the maximum.

Further, in the above film method, it is important to adjust the viscosity of the sealant in order to certainly introduce the sealant through the holes formed in the film into the predetermined through-holes and to tightly seal them. Especially for the honeycomb having through-holes with a small opening area, accurate adjustment is required. Namely, when a slurry having a low viscosity is employed as the sealant, the slurry can readily be introduced even from relatively small holes, but shrinkage of the sealed portions upon drying increases, whereby cracks or ruptures are likely to result at the sealed portions. Further, the slurry can not be maintained at the center portions of the sealed through-holes, and the center portions are likely to remain in a perforated state, and thus it tends to be difficult to form tightly sealed portions. When a sealing material having a high viscosity is employed, it will be required to introduce it under pressure, whereby the film is likely to be raptured during the operation. Further, as mentioned above, the area of holes in the film is small as compared with the opening area of the through-holes. Accordingly, void spaces are likely to remain at the corner portions of the through-holes or between the sealant and the film, whereby it will be difficult to form tightly sealed portions.

As a means to solve such problems, Japanese Unexamined Patent Publication No. 7215/1982 (U.S. Pat. No. 4,293,357) discloses a method wherein firstly, holes are formed in the film at portions corresponding to the through-holes not to be sealed, an epoxy resin or the like is introduced by a dipping method, followed by curing, then the film is peeled, and a sealant is introduced under high pressure. By this method, the sealant can directly be filled into the opened through-holes, and the introduction is extremely easy. Whereas, it is rather difficult to introduce the epoxy resin or the like into the through-holes, and substantial labor and time are required for a step of bonding the film on the end face of the honeycomb and forming holes at portions corresponding to the through-holes not to be sealed, and a step of curing the introduced epoxy resin. Further, void spaces are likely to form between the cured epoxy resin or the like and the walls of the through-holes. Further, there is a problem that the thermal expansion of the epoxy resin or the like, is large, whereby the walls of the through-holes are likely to be damaged in the calcining step.

Further, in either the above film method or the above-mentioned temporary sealing method with an epoxy resin or the like, it is required to repeat, after sealing or temporarily sealing one end face (A), the same step also at the other end face (B), and there has been a problem also with respect to the productivity.

SUMMARY OF THE INVENTION

The present invention has been made under these circumstances. An object of the present invention is to provide a process which comprises temporarily sealing through-holes not to be sealed among through-holes of the honeycomb and then introducing a sealant into the rest of through-holes to be sealed, followed by sealing at the ends of the through-holes, wherein the temporary sealing can certainly and easily be carried out, and the through-holes can tightly be sealed.

Another object of the present invention is to produce the honeycomb having through-holes sealed at their ends, at improved productivity.

A further object of the present invention is to produce DPF at improved productivity.

In a first aspect, the present invention provides a process for sealing an end face of a ceramic honeycomb structure comprising the following steps (a) to (d), (e) to (i) or (j) to (n):

(a) a step of introducing an expansive material which can be burned off, into through-holes not to be sealed, among through-holes of the honeycomb structure;

(b) a step of expanding the expansive material to temporarily seal the through-holes not to be sealed, at their ends;

(c) a step of filling a sealant into ends of through-holes to be sealed; and (d) a step of burning off the expansive material and sintering the sealant at the same time.

(e) a step of printing a combustible material which can be burned off, at predetermined positions on a member which is capable of covering the end face of the ceramic honeycomb structure;

(f) a step of mounting the honeycomb structure on the member, so that through-holes not to be sealed, among through-holes of the ceramic honeycomb structure, abut on the printed combustible material;

(g) a step of transferring the combustible material to the end face of the ceramic honeycomb structure to temporarily seal the through-holes not to be sealed, at their ends;

(h) a step of filling a sealant into ends of through-holes to be sealed; and (i) a step of burning off the combustible material and sintering the sealant at the same time.

(j) a step of temporarily sealing through-holes not to be sealed, at their ends by means of at least one of the methods set out above, at one end face (A) of the ceramic honeycomb structure;

(k) a step of mounting the ceramic honeycomb structure on a member which is capable of covering the end face thereof, so that said temporarily sealed one end face (A) faces upward, and the other end face (B) not sealed, faces downward;

(l) a step of dropping a combustible material which can be burned off, into through-holes other than said temporarily sealed through-holes, from above said one end face (A) of the ceramic honeycomb structure, to temporarily seal other through-holes not to be sealed, at their ends, at the other end face (B);

(m) a step of filling a sealant into ends of through-holes to be sealed; and (n) a step of burning off the expansive material and/or the combustible material, and sintering the sealant at the same time.

In another aspect, the present invention provides a process for producing a ceramic honeycomb structure having predetermined through-holes sealed at their ends, which comprises the following steps (o) to (q):

(o) a step of molding a ceramic honeycomb molded product;

(p) a step of temporarily sealing through-holes not to be sealed, at their ends and filling a sealant into ends of through-holes to be sealed, by means of at least one of the methods set out above; and (q) a step of heating and calcining the ceramic honeycomb molded product temporarily sealed and having the sealant filled as mentioned above, to sinter the sealant and the ceramic honeycomb molded product and to burn off the expansive material and/or the combustible material.

PREFERRED EMBODIMENTS OF THE INVENTION

Now, the present invention will be described in detail with reference to the preferred embodiments.

In the present invention, the material for the honeycomb is not particularly limited, and cordierite, mullite, alumina, zirconia, silicon carbide, silicon nitride, or a composite material thereof may, for example, be used. In the present invention, an organic binder and a dispersing medium such as water are added to such a ceramic material powder to obtain a slurry, which is then molded into a honeycomb form. As the organic binder, methylcellulose, ethylcellulose, carboxymethylcellulose, polyvinyl alcohol, starch or wax emulsion may, for example, be used.

As a method for molding a ceramic honeycomb molded product, it is possible to employ extrusion molding, sheet molding or press molding. However, it is usually preferred to employ extrusion molding. The circumferential shape of the molded product or the shape of through-holes may be a round shape such as a circular or oval shape, or a polygonal shape such as a quadrilateral shape or a hexagonal shape.

The honeycomb of the present invention can advantageously be produced by a process wherein among through-holes of the ceramic honeycomb molded product thus obtained, through-holes not to be sealed, are temporarily sealed at their ends, a sealing material is filled into ends of through-holes to be sealed, followed by heating and calcining to sinter the sealant and the ceramic honeycomb molded product and to burn off the material used for temporary sealing. This production process has a merit such that sintering of the ceramic honeycomb molded product and sealing of through-holes can be carried out by a single operation of heating and calcination. However, the present invention is not limited to such a process. For example, the ceramic honeycomb molded product may preliminarily be sintered, and then sealing may be carried out by a process which will be described hereinafter.

Firstly, a sealing process comprising steps (a) to (d) of the present invention will be described.

Step (a) of the present invention is a step of introducing an expansive material which can be burned off, into through-holes not to be sealed. The expansive material to be used in this step, is a material which undergoes a volume expansion, such as a material which expands upon application of an energy of e.g. light or heat, an expandable material which expands upon foaming, a highly water-absorptive resin, an expandable rubber or high molecular weight polymer which expands upon gelation, and it may be any material so long as such a material is capable of temporarily seal through-holes at their ends without breakage or displacement of the temporary sealed portions at the time of filling the sealant in step (c). Among them, the most convenient material is an expandable material which expands upon foaming. Such an expandable material may, for example, be the one having a low boiling point saturated hydrocarbon such as propane, butane or pentane or an organic foaming agent such a halogenated hydrocarbon e.g. methyl chloride or chlorodifluoroethane, impregnated in a resin such as polystyrene, polyethylene, polypropylene, polyurethane or acrylonitrile. Among them, expandable polystyrene or expandable polyethylene is preferred. The type and the amount of such an expansive material are selected depending upon the size of through-holes to be temporarily sealed, or the volume expansivity at the time of expansion.

With respect to a method for introducing the expansive material into through-holes not to be sealed, in a case where the expansive material is a viscous liquid, introduction can be carried out by coating, injection or dipping after masking through-holes to be sealed, at the end face. Otherwise, the expansive material may directly be introduced into the through-holes by means of an injection syringe or pen. On the other hand, when the expansive material is a powder, it may be formed into a paste or slurry by means of a dispersing medium not to impair the property of the expansive material, and then such a paste or slurry may be introduced by the above method. In the case of an expansive material having good flowability such as expandable beads, it may be introduced directly or after granulated by means of e.g. a binder, into the through-holes by dropping it from above the through-holes. In any case, upon introduction of the expansive material into the through-holes, it is not required to have tightly temporarily sealed portions, because in the present invention, in the next step (b), the expansive material is expanded to form tightly temporarily sealed portions. Therefore, according to the present invention, introduction of the expansive material is very easy, and the productivity can remarkably be improved by selecting size and number of through-holes, the type of the expansive material and the method for its introduction.

Step (b) of the present invention is a step of expanding the expansive material thus introduced to temporarily seal the through-holes not to be sealed, at their ends. The expansive material may be expanded by, for example, a method wherein a ceramic honeycomb molded product having the expansive material introduced into the predetermined honeycomb through-holes, is maintained in an atmosphere heated sufficiently for foaming, a method wherein a ceramic honeycomb molded product having the expansive material introduced, is mounted on a plate- or sheet-form member, followed by heating, or a method wherein a ceramic honeycomb molded product having the expansive material introduced, is mounted on a heated plate- or heat-form member.

By such step (b) of the present invention, temporarily sealed portions excellent in adhesion to through-hole walls can readily be formed. Accordingly, it will be possible directly and certainly fill the sealant only to the predetermined through holes to be sealed, in step (c), whereby tightly sealed portions can be formed. Especially when a material expandable by e.g. heating is used as the expansive material, it is possible to shorten the time required for the expanding step, whereby temporarily sealed portions can be formed without requiring the substantial time and labor as heretofore required. Further, this temporarily sealed portions are capable of being burned off by heating and therefore can readily be removed without damaging the through-hole walls after step (c).

After temporarily sealing the through-holes not to be sealed, at their ends, at one end face (A) of the honeycomb, as described above, the same operations as steps (a) and (b) will be conducted also at the other end face (B) to temporarily seal other through-holes at their ends.

Step (c) of the present invention is a step of filling a sealant into the ends of through-holes to be sealed. This step is carried out at openings of the through-holes present at one end face (A) of the honeycomb and at the other end face (B).

The material for the sealant may be any material so long as the formed sealed portions will not have cracks due to e.g. a difference in thermal expansion, even when subjected to heating and calcination in the subsequent step (d). However, usually the same material as the honeycomb, or the one composed essentially thereof, is used. The sealant is filled usually by a method wherein a sealant slurry is prepared, and the slurry is filled by e.g. dipping or injection. However, in a case where the area of through-holes is small, the dipping method is preferred. The viscosity of the sealant slurry is preferably from 100 to 1,500 cps, more preferably from 300 to 700 cps. To the sealant slurry, an additive such as a binder or a dispersant may be incorporated, as the case requires. The binder may, for example, be methylcellulose, ethylcellulose, carboxymethylcellulose, polyvinyl alcohol, starch or wax emulsion. The dispersant may, for example, be ammonium polycarboxylate, ammonium polyacrylate, methyl polyacrylate or a glycerol fatty acid ester type surfactant.

Step (d) of the present invention is a step of burning off the expansive material constituting the temporarily sealed portions and sintering the sealant at the same time. When the honeycomb used has not yet been sintered, sintering of such a honeycomb is simultaneously carried out in this step. The conditions for this step are not particularly limited so long as heating and calcination can be carried out in an atmosphere wherein the expansive material can be burned off. For example, in a case where the honeycomb is of an oxide type such as cordierite or mullite, heating and calcination are conducted in an oxidative atmosphere having a temperature of from 1,000° to 1,600° C., and in a case where the honeycomb is a non-oxide type such as silicon carbide or silicon nitride, heating and calcining are carried out under a non-oxidative atmosphere such as nitrogen or argon at a temperature of from 1,500° to 2,300° C.

Now, the sealing process of the present invention comprising steps (e) to (i) will be described. This sealing process is suitable for a case wherein the cross-sectional area of through-holes of the honeycomb is small, and the number of through-holes to be temporarily sealed is large.

Step (e) of the present invention is a step of printing a combustible material which can be burned off, at predetermined positions on a member which is capable of covering the end face of the honeycomb. The positions at which printing is made, are positions corresponding to openings of the through-holes not to be sealed.

As the printing method, screen printing is preferred. Namely, a paste containing the combustible material is screen-printed on the above member in a pattern corresponding to the openings of the through-holes not to be sealed.

As another printing method, it is possible to employ, for example, a method wherein a copper foil is bonded to an end face of the honeycomb, then a resist ink or the like is printed in a pattern corresponding to the openings of the through-holes not to be sealed at the end face of the honeycomb, followed by etching to open through-holes to be sealed other than the printed portion, or a method wherein a water soluble film of e.g. polyvinyl alcohol is bonded to an end face of the honeycomb, then, a non-water soluble material such as grease is printed in a pattern corresponding to the opening not to be sealed, followed by dipping in water to dissolve the water soluble film and to open through-holes to be sealed.

The combustible material to be used in step (e) is preferably an expansive material. Particularly preferred is a material readily expandable upon foaming by heating, such as expandable polystyrene or expandable polyethylene. The reasons are such that the printed expansive material is expanded by foaming at the ends in the through-holes to form tightly temporarily sealed portions, and the operation to bring the printing pattern to agree completely with the pattern of the temporarily sealed portions of the through-holes can be simplified. Namely, in the present invention, the printed pattern of the expansive material is not necessarily required to completely agree with the pattern of the temporarily sealed portions of the through-holes. It is possible to print the expansive material in a pattern smaller than the area of the opening of the through-holes. For example, in a case where an expansive material capable of expanding a few tens times in volume, is used, it may be printed in a size of about one half of the opening area of the through-holes. For example, when the shape of the through-holes is a square of 2×2 mm, such an expansive material may be printed in a circular shape with a diameter of about 1 mm, and if it is a square of 1×1 mm, such an expansive material may be formed in a circular shape with a diameter of about 0.5 mm, with the thickness being from about 0.1 to 2.0 mm in each case.

Further, it is important that the member used in step (e) is in the form of a plate or sheet having a smooth and flat surface so that it is closely in contact with the end face of the honeycomb mounted thereon. When the honeycomb is mounted, if there exists a space between the member and the end face of the honeycomb, the strength of the temporarily sealed portions tends to low, and the openings of the adjacent through-holes tend to be clogged.

The material for the member used in step (e) is selected depending upon the type of the combustible material. When a material expandable by heating is used as the combustible material, a heat resistant metal or ceramic may be used, and in the case of a material expandable by light or the like, transparent glass or plastics may be employed. Of course, a member made of other material, may be employed. Further, it is preferred to employ a material having a good release property, for example boron nitride, in the case of a ceramic, so that the combustible material printed on the member can readily be released and transferred from the member to the end face of the honeycomb in steps (f) and (g). In a case of other materials, the release property can be improved by preliminarily coating a release agent or oil on the surface.

Step (f) of the present invention is a step of mounting the honeycomb on the member, so that through-holes not to be sealed, among through-holes of the honeycomb, abut on the printed combustible material. In the present invention, when an expansive material is used as the combustible material, the printing pattern can be made smaller than the pattern of the temporarily sealed portions of the through-holes, whereby the honeycomb can easily be mounted on the member.

Step (g) of the present invention is a step of releasing the printed combustible material from the member and transferring it to the end face of the honeycomb to temporarily seal the through-holes not to be sealed, at their ends. To carry out this step, for example, in a case where a material expandable upon foaming by heating, is used as the combustible material, it is possible to employ a method wherein the above member and the honeycomb mounted thereon and having the combustible material introduced thereinto, are maintained in an atmosphere wherein the combustible material is able to sufficiently expand upon foaming, or a method wherein a honeycomb having the combustible material introduced is mounted on the above member, and then this assembly is placed on a heated iron plate or the like to foam and expand the combustible material.

After temporarily sealing the through-holes not to be sealed, at their ends, at one end face (A) of the honeycomb as described above, the same operations as in step (e) to (g) will be carried out at the other end face (B) to temporarily seal other through-holes at their ends.

Steps (h) and (i) of the present invention are carried out in the same manner as the above step (c) and (d), respectively.

According to the sealing process of the present invention comprising the above steps (e) to (i), a printing method is employed to introduce the combustible material, whereby the conventional step of bonding a film or forming holes, is not required. Thus, according to the present invention, even a high performance honeycomb having an extremely small opening area of through-holes and a large number of through-holes, can be easily produced without requiring so much time and labor.

Now, the sealing process of the present invention comprising steps (j) to (n) will be described. This process is a process suitable for a case wherein a high performance honeycomb having an extremely small opening area of through-holes and a large number of through-holes is produced, wherein after temporarily sealing through-holes not to be sealed, at their ends, at one end face (A) of the honeycomb, also at the other end face (B), other through-holes not to be sealed, will be temporarily sealed at their ends.

Step (j) of the present invention is a step of temporarily sealing through-holes not to be sealed, at their ends, at one end face (A) of the honeycomb, by the above steps (a) to (b) or steps (e) to (g), and thus is carried out as described above.

Step (k) of the present invention is a step of mounting the honeycomb on a member which is capable of covering the end face of the honeycomb, so that one end face (A) temporarily sealed in step (j), faces upward, and the other end face (B) not temporarily sealed, faces downward. As the member to be used in this step, the same member as described in the above step (e), can be used. As such a member, preferred is the one which does not substantially deform even when the combustion material is heated to a foaming temperature.

Step (l) of the present invention is a step of dropping a combustible material which can be burned off, from openings of the through-holes at said one end face (A) of the honeycomb to temporarily seal, at the other end face (B), other through-holes not to be sealed, at their ends.

The combustible material to be used in step (l) may be any material so long as it can be burned off by calcination. However, it is preferably an expansive material. Particularly preferred is a material which is easy in handling, has good flowability and is capable of readily foaming and expanding by heating, such as expandable polystyrene beads or expandable polyethylene beads. The reason is that an expansible combustible material is introduced into through-holes and then expanded, and it is not necessary to tightly fill the material by the dropping operation, and tightly temporarily sealed portions can easily be formed by expanding the material.

At the time of dropping the combustible material, it is effective to impart vibration to the honeycomb by means of a vibration apparatus. Then, by heating the above member, or by mounting the honeycomb on a preliminarily heated member and then dropping the combustive material, the combustible material will be expanded at the lower end face to form tightly temporarily sealed portions. To expand the combustible material dropped to the lower end face, for example, in a case where heat expandable polyethylene beads are used, it is possible to employ a method wherein the plate member located at the lower end face is heated to the foaming temperature after the dropping, or a method wherein the honeycomb is mounted on a preliminarily heated plate member and then polystyrene beads are dropped from the upper end face and expanded at the lower end face.

Steps (m) and (n) of the present invention are carried out in the same manner as the above steps (c) and (d), respectively.

According to the sealing process of the present invention comprising the above steps (j) to (n), it is unnecessary to repeat the same step for both end faces as required heretofore, and it is possible that once one end face (A) is temporarily sealed, the other end face (B) can readily temporarily be sealed. Therefore, the time required for sealing both end faces can be substantially reduced. Further, a jig for sealing, consumption goods such as films or masks and large accompanying installations are not required, whereby the productivity will be improved.

As described in the foregoing, according to the sealing process of the present invention comprising steps (a) to (d), steps (e) to (i) or steps (j) to (n), filling of the sealant is not carried out through holes formed in a film, as has been heretofore common, and can easily be carried since the sealant can be directly filled from openings at ends of through-holes not temporarily sealed. Besides, it is possible to form tightly sealed portions. Especially, the present invention exhibits remarkable effects as a process for sealing through-holes having a small opening area, which has been difficult by the prior art techniques, whereby highly reliable sealed portions can be formed, which are free from cracking or rupture.

The sealing methods of the present invention can be applied to ceramic honeycomb molded products to be sealed whether the molded products have been already calcined or have not yet been calcined. The process for producing the honeycomb of the present invention comprising steps (o) to (q) is a technology in which a ceramic honeycomb molded product which has not yet been calcined, is used, and sintering of such a ceramic honeycomb molded product and the sealant is carried out simultaneously with burning off of the expansive or combustible material for temporary sealing by a single operation of heating and calcining.

Now, the present invention will be described in further detail with reference to Examples and Comparative Examples. However it should be understood that the present invention is by no means restricted to such specific Examples.

EXAMPLE 1

Preparation of a Honeycomb by Steps (a) to (d)

Added to 100 parts by weight of α-form silicon carbide powder having an average particle size of 10 μm (manufactured by Yakushima Denko), were 15 parts by weight of methylcellulose as an organic binder, 25 parts by weight of water and 2 parts by weight of a stearic acid emulsion, and the mixture was uniformly mixed by a Henschel mixer and then molded into a ceramic honeycomb molded product by means of an auger-type vacuum extrusion molding machine. This ceramic honeycomb molded product had an end face of 100×100 mm, a length of 100 mm, a cell wall thickness of 0.2 mm, a cell pitch of 1.2 mm and a number of cells being 400 cells/square inch. The shape of each through-hole of this ceramic honeycomb molded product was a square. This ceramic honeycomb molded product is to be dried, then have predetermined through-holes sealed at their ends by a sealant and then be calcined after a degreasing step. (Step (o) of the present invention).

Firstly, 3 parts by weight of methylcellulose and 40 parts by weight of α-terpineol were added to 100 parts by weight of an expansive material to be burned off ("Matsumoto Microsphere" F-50, tradename for high temperature expandable resin, manufactured by Matsumoto Yushi Seiyaku K. K.) having an average particle size of 20 μm, and the mixture was kneaded to obtain a paste for temporary sealing having a viscosity of 5,000 cps.

Then, a polyester film was bonded to one end face (A) of the dried ceramic honeycomb molded product, then holes with a diameter of 0.5 mm were formed on the film at positions corresponding to through-holes not to be sealed, by means of a needle jig, and then the paste for temporary sealing was coated on this end face (A) by means of a brush to introduce the paste for temporary sealing from the film holes into the through-holes. (Step (a) of the present invention).

Then, this film was peeled off, and the ceramic honeycomb molded product was mounted on a metal plate heated to 100° C., so that the end face having the paste for temporary sealing introduced, was in contact with the metal plate, and left to stand for one minute to expand the expansive material introduced into the through-holes to temporarily seal the through-holes not to be sealed. (Step (b) of the present invention).

Also with respect to the other end face (B) of the ceramic honeycomb molded product, the same operation as described above, was carried out to temporarily seal the through-holes not to be sealed, which are different from the through-holes temporarily sealed by the above step.

Then, with respect to the ceramic honeycomb molded product having both end faces thus temporarily sealed, a sealant was filled in ends of through-holes to be sealed, as follows. (Steps (c) and (p) of the present invention).

Namely, 3 parts by weight of methylcellulose, 33 parts by weigh of water and 1 part by weight of trimethylamine as a dispersant, were added to 100 parts by weight of α-form silicon carbide powder having an average particle size of 3 μm (manufactured by Yakushima Denko) to obtain a sealant slurry having a viscosity of 500 cps. One end face (A) of the ceramic honeycomb molded product was dipped in this slurry for 3 minutes to have the sealant deposited and solidified in a depth of 5 mm at ends of the through-holes to be sealed. In the same manner, the sealant was filled also at the other end face (B).

Then, the sealed molded product was subjected to hot air drying at 50° C. for 5 hours and then to a degreasing step at 600° C. for one hour. Further, it was subjected to calcination at 2,100° C. for 2 hours in an inert atmosphere to burn off the expansive material and sinter the ceramic honeycomb molded product and the sealant, to obtain a sealed honeycomb. (Steps (d) and (q) of the present invention).

In the foregoing all steps, the times required for sealing one end face (A) and the other end face (B) of the ceramic honeycomb molded product i.e. the times required to carry out steps (a), (b) and (c), were measured. The results are shown in Table 1 and FIG. 1. With respect to the obtained honeycomb, the presence or absence of cracks or spaces at the sealed portions, was inspected by an optical microscope, and the sealing condition was examined. The results are shown in Table 2.

EXAMPLE 2

Preparation of a Honeycomb by Steps (e) to (i)

3 parts by weight of methylcellulose and 40 parts by weight of α-terpineol were added to 100 parts by weight of a combustible material to be burned off ("Matsumoto Microsphere" F-50, tradename for a high temperature expandable resin, manufactured by Matsumoto Yushi Seiyaku K. K.) having an average particle size of 20 μm, and the mixture was kneaded to obtain a paste for temporary sealing having a viscosity of 5,000 cps.

Then, a lubricating oil was coated as a release agent on a stainless steel plate of 150×150 mm having a thickness of 3 mm, and then the paste for temporary sealing was screen-printed in a checkered pattern of circles having a diameter of 0.5 mm and a thickness of 0.5 mm, at positions corresponding to openings of through-holes to be temporarily sealed. (Step (e) of the present invention).

A dried ceramic honeycomb molded product prepared in the same manner as in Example 1, was mounted on the plate, so that the printed circular patterns were located within the openings of the through-holes not to be sealed (to be temporarily sealed) at one end face (A) of the ceramic honeycomb molded product. (Step (f) of the present invention).

Then, this plate was placed on a metal plate heated to 100° C. for one minute to expand the printed expandable combustible material thereby to transfer the combustible material to the end face of the ceramic honeycomb molded product. Then, the molded product was withdrawn from the plate, and temporary sealing was carried out. Also with respect to the other end face (B), the same operation was carried out to temporarily seal other through-holes not to be sealed, at their ends. (Step (g) of the present invention).

Thereafter, filling of a sealant and calcination were carried out in the same manner as in Example 1 to obtain a honeycomb. (Steps (h) and (i) of the present invention).

Figures 1, 2:
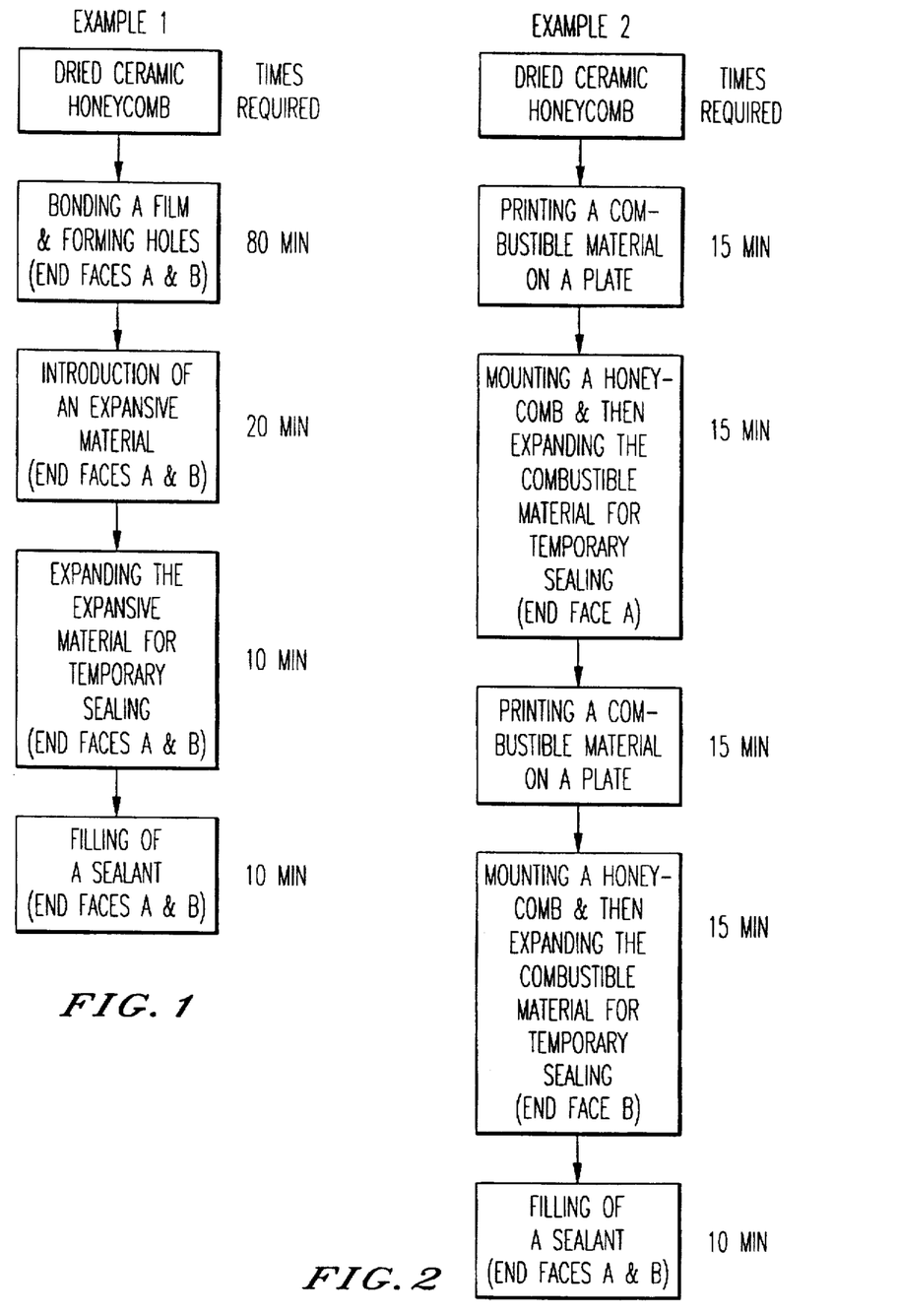
FIG. 1 is a diagram showing the process steps and the respective required times in Example 1.
FIG. 2 is a diagram showing the process steps and the respective required times in Example 2.

The times required for the sealing and the sealing condition were measured, and the results are shown in Tables 1 and 2 and in FIG. 2.

EXAMPLE 3

Preparation of a Honeycomb by Steps (i) to (n)

In the same manner as in Example 2, through-holes not to be sealed at one end face (A) of a ceramic honeycomb molded product, were temporarily sealed with an expandable combustible material. (Step (j) of the present invention).

Then, a glass plate of 150×150 mm having a thickness of 3 mm, was placed on a vibration apparatus, and the ceramic honeycomb molded product was mounted on the glass plate. At that time, one end face (A) faced upward, and the other end face (B) faced downward. (Step (k) of the present invention).

While driving the vibration apparatus, 10 g of expandable polystyrene beads having an average particle size of 0.5 μm were dropped into through-holes other than the temporarily sealed through-holes, to temporarily seal other through-holes not to be sealed, at their ends, at the other end face (B). At that time, a tape was put around the periphery of the above end face to form a frame to prevent the supplied expandable polystyrene beads from scattering from the periphery. One minute later, the vibration was stopped, and the other end face (B) was observed from below the glass plate, to confirm that the expanded polystyrene beads were dropped to the lower end face.

Then, this glass plate was placed on a metal plate heated to 120° C. for one minute to expand the expandable polystyrene beads dropped to the lower end face thereby to temporarily seal other through-holes not to be sealed. (Step (l) of the present invention).

Thereafter, filling of the sealant and calcination were carried out in the same manner as in Example 1 to obtain a honeycomb. (Steps (m) and (n) of the present invention).

Figures 3, 4:
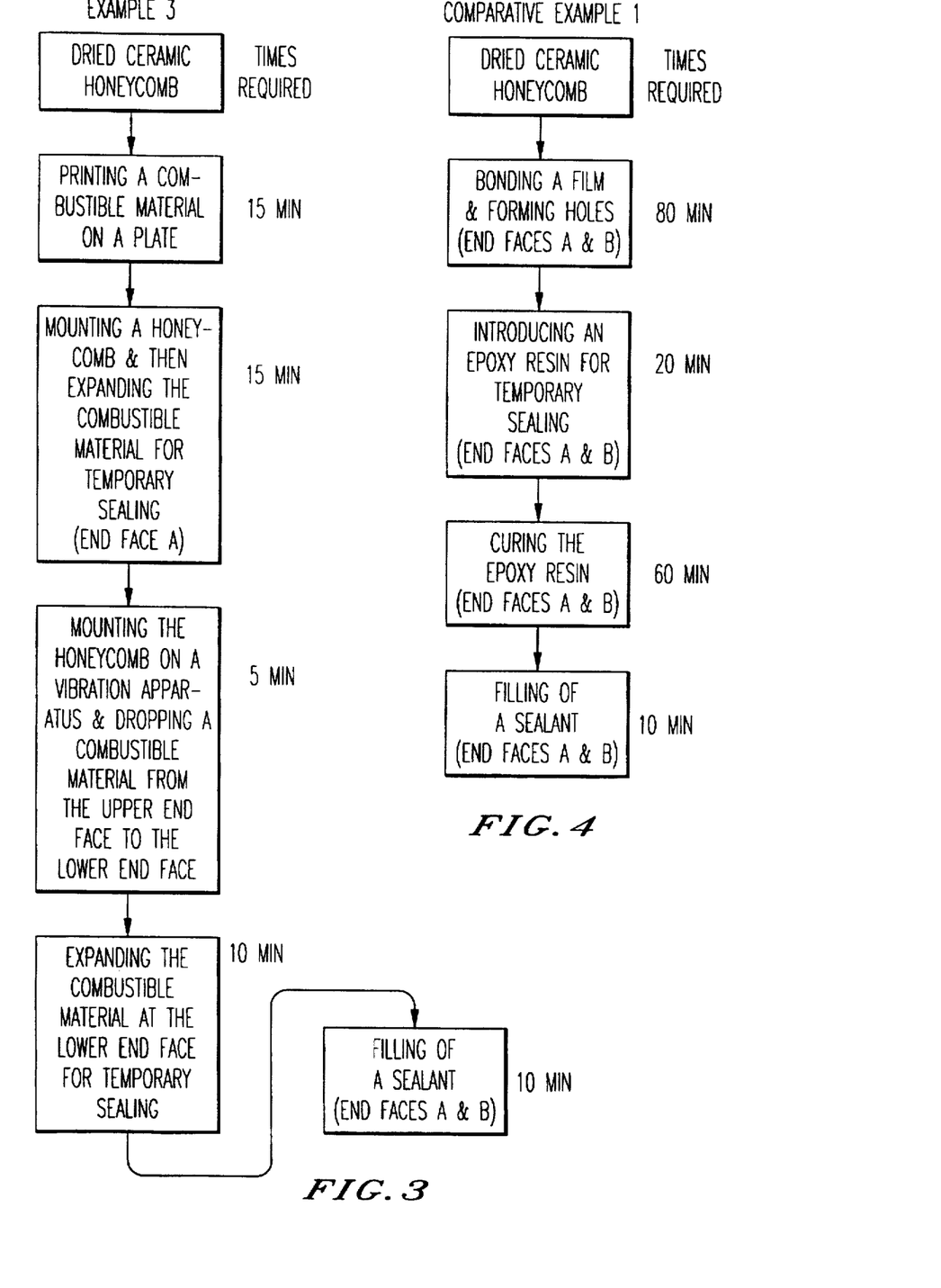
FIG. 3 is a diagram showing the process steps and the respective required times in Example 3.
FIG. 4 is a diagram showing the process steps and the respective required times in Comparative Example 1.

The times required for the sealing and the sealing condition were measured, and the results are shown in Tables 1 and 2 and in FIG. 3.

COMPARATIVE EXAMPLE 1

Polyester films were bonded to both end faces (A) and (B) of the same dried ceramic honeycomb molded product as used in Example 1, and then holes with a diameter of 0.5 mm were formed at positions corresponding to the through-holes not to be sealed, by means of a needle jig.

Then, an epoxy resin was coated on both end faces to introduce the epoxy resin from the holes into the through-holes, followed by drying at 50° C. for 60 minutes to cure the resin thereby to temporarily seal both end faces. Thereafter, filling of a sealant and calcination were carried out in the same manner as in Example 1 to obtain a honeycomb. The results are shown in Tables 1 and 2 and in FIG. 4.

COMPARATIVE EXAMPLE 2

Figure 5:
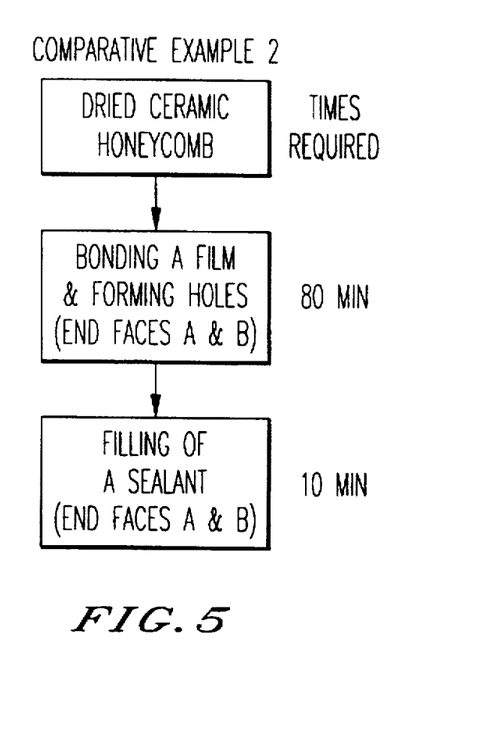
FIG. 5 is a diagram showing the process steps and the respective required times in Comparative Example 2.

In the same manner as in Comparative Example 1, polyester films were bonded to both end faces (A) and (B) of a ceramic honeycomb molded product, and then holes with a diameter of 0.5 mm were formed at positions corresponding to the through-holes to be sealed, by means of a needle jig. Thereafter, filling of a sealant and calcination were carried out in the same manner as in Example 1 to obtain a honeycomb. The results are shown in Tables 1 and 2 and in FIG. 5.

TABLE 1

| | Temporary sealing method | | Time required for sealing (min) | | |
|---|---|---|---|---|---|
| | End face A | End face B | End face A | End face B | Total |
| Example 1 | Expansive material | Expansive material | 60 | 60 | 120 |
| Example 2 | Combustible material + printing | Combustible material + printing | 35 | 35 | 70 |
| Example 3 | Combustible material + printing | Combustible material + dropping | 35 | 20 | 55 |
| Comparative Example 1 | Epoxy resin | Epoxy resin | 85 | 85 | 170 |
| Comparative Example 2 | — | — | 50 | 50 | 100 |

TABLE 2

| | Presence or absence of seal leakage | |
|---|---|---|
| | End face A | End face B |
| Example 1 | Nil | Nil |
| Example 2 | Nil | Nil |
| Example 3 | Nil | Nil |
| Comparative Example 1 | 1 to 10 portions | 1 to 10 portions |
| Comparative Example 2 | at least 10 portions | at least 10 portions |

As is evident from Tables 1 and 2, in Comparative Example 1, in some of through-holes, temporary sealing by the epoxy resin was not sufficient, and spaces were formed, whereby flow-in of the sealant was observed. Further, due to expansion of the resin during the calcination, cracks formed on the end faces of the honeycomb. Furthermore, much time was required for the sealing step. Also in Comparative Example 2, many spaces were observed at the sealed portions of the through-holes.

Whereas, in Examples 1 to 3, no cracks or seal leakages such as spaces were observed at the sealed portions, and the end faces were tightly sealed. Further, it has been proved that the sealing process can be easily carried out in a short period of time by employing the process of Example 2 or 3. By these Examples, comparison and evaluation were carried out with respect to a process for sealing only one ceramic honeycomb. However, also in the case of mass production, similar or even better effects can be expected.

As described in the foregoing, according to the present invention, through-holes not to be sealed, of a honeycomb can certainly and easily be temporarily sealed at their ends. Accordingly, a sealant can directly be filled into openings of through-holes to be sealed, whereby it is possible to form tightly sealed portions. Especially, sealing of a honeycomb having through-holes with a small opening area, which used to be difficult to seal, can readily be carried out, and highly reliable sealed portions can be formed without forming spaces or cracks at the sealed portions after calcination.

The honeycomb produced by the process of the present invention can be used advantageously, for example, as DPF.

What is claimed is:

1. A process for sealing an end face of a ceramic honeycomb structure comprising:
    introducing an expansive material which can be burned off, into through-holes not to be sealed, among through-holes at one end face (A) of the honeycomb structure;
    expanding the expansive material to temporarily seal the through-holes not to be sealed, at their ends;
    mounting the ceramic honeycomb structure on a member which is capable of covering the end face thereof, so that said temporarily sealed one end face (A) faces upward, and the other end face (B) not sealed, faces downward:
    dropping a combustible material which can be burned off, into through-holes other than said temporarily sealed through-holes, from above said one end face (A) of the ceramic honeycomb structure, to temporarily seal other through-holes not to be sealed, at their ends, at the other end face (B);
    filling a sealant into ends of throughholes to be sealed; and
    burning off the expansive material and the combustible material and sintering the sealant at the same time.

2. The process for sealing an end face of a ceramic honeycomb structure according to claim 1 wherein the ceramic is made of silicon carbide.

3. The process for sealing an end face of a ceramic honeycomb structure according to claim 1, wherein the ceramic honeycomb structure is a diesel particulate filter.

4. A process for producing a ceramic honeycomb structure having predetermined through-holes sealed at their ends, which comprises:
    molding a ceramic honeycomb molded structure;
    introducing an expansive material which can be burned off, into through-holes not to be sealed, among through-holes at one end face (A) of the honeycomb structure:
    expanding the expansive material to temporarily seal the through-holes not to be sealed, at their ends:
    mounting the ceramic honeycomb structure on a member which is capable of covering the end face thereof, so that said temporarily sealed one end face (A) faces upward, and the other end face (B) not sealed, faces downward:
    dropping a combustible material which can be burned off, into through-holes other than said temporarily sealed through-holes, from above said one end face (A) of the ceramic honeycomb structure, to temporarily seal other through-holes not to be sealed, at their ends, at the other end face (B);
    filling a sealant into ends of throughholes to be sealed; and
    heating and calcining the ceramic honeycomb molded structure temporarily sealed and having the sealant filled as mentioned above, to sinter the sealant and the ceramic honeycomb molded structure and to burn off the expansive material the combustible material.

5. A process for sealing an end face of a ceramic honeycomb structure comprising the following steps:
    of printing a combustible material which can be burned off, at predetermined positions on a member which is capable of covering the end face of the ceramic honeycomb structure;

of mounting the honeycomb structure on the member, so that through-holes not to be sealed, among through-holes of the ceramic honeycomb structure, abut on the printed combustible material;

of transferring the combustible material to the end face of the ceramic honeycomb structure to temporarily seal the through-holes not to be sealed, at their ends;

of filling a sealant into ends of through-holes to be sealed; and (i) of burning off the combustible material and sintering the sealant at the same time.

6. The process for sealing an end face of a ceramic honeycomb structure according to claim 5, wherein the combustible material is an expansive material, and the expansive material is expanded in the ends of the through-holes not to be sealed, to temporarily seal the ends of the through-holes not to be sealed, at their ends.

7. The process for sealing an end face of a ceramic honeycomb structure according to claim 5, wherein the ceramic is made of silicon carbide.

8. The process for sealing an end face of a ceramic honeycomb structure according to claim 5, wherein the ceramic honeycomb structure is a diesel particulate filter.

9. A process for producing a ceramic honeycomb structure having predetermined through-holes sealed at their ends, which comprises the following steps:

of molding a ceramic honeycomb molded product;

printing a combustible material which can be burned off, at predetermined positions on a member which is capable of covering the end face of the ceramic honeycomb structure;

mounting the honeycomb structure on the member, so that through-holes not to be sealed, among through-holes of the ceramic honeycomb structure, abut on the printed combustible material;

transferring the combustible material to the end face of the ceramic honeycomb structure to temporarily seal the through-holes not to be sealed, at their ends;

filling a sealant into ends of through-holes to be sealed; and of heating and calcining the ceramic honeycomb molded product temporarily sealed and having the sealant filled as mentioned above, to sinter the sealant and the ceramic honeycomb molded product and to burn off the combustible material.

10. A process for sealing an end face of a ceramic honeycomb structure comprising the following steps:

printing a combustible material which can be burned off, at predetermined positions on a member which is capable of covering the end face of the ceramic honeycomb structure;

mounting the honeycomb structure on the member, so that through-holes not to be sealed, among through-holes of the ceramic honeycomb structure, abut on the printed combustible material;

transferring the combustible material to one end face (A) of the ceramic honeycomb structure to temporarily seal the through-holes not to be sealed, at their ends;

mounting the ceramic honeycomb structure on a member which is capable of covering the end face thereof, so that said temporarily sealed one end face (A) faces upward, and the other end face (B) not sealed, faces downward;

of dropping a combustible material which can be burned off, into through-holes other than said temporarily sealed through-holes, from above said one end face (A) of the ceramic honeycomb structure, to temporarily seal other through-holes not to be sealed, at their ends, at the other end face (B);

of filling a sealant into ends of through-holes to be sealed; and of burning off the combustible material and sintering the sealant at the same time.

11. The process for sealing an end face of a ceramic honeycomb structure according to claim 10, wherein the combustible material is an expansive material, and the expansive material is expanded in the ends of the through-holes not to be sealed, to temporarily seal the ends of the through-holes not to be sealed.

12. The process for sealing an end face of a ceramic honeycomb structure according to claim 11, wherein the ceramic is made of silicon carbide.

13. The process for sealing an end face of a ceramic honeycomb structure according to claim 11, wherein the ceramic honeycomb structure is a diesel particulate filter.

14. The process for sealing an end face of a ceramic honeycomb structure according to claim 10, wherein the ceramic is made of silicon carbide.

15. The process for sealing an end face of a ceramic honeycomb structure according to claim 10, wherein the ceramic honeycomb structure is a diesel particulate filter.

16. A process for producing a ceramic honeycomb structure having predetermined through-holes sealed at their ends, which comprises:

molding a ceramic honeycomb molded structure;

printing a combustible material which can be burned off, at predetermined positions on a member which is capable of covering the end face of the ceramic honeycomb molded structure;

mounting the ceramic honeycomb molded structure on the member, so that through-holes not to be sealed, among through-holes of the ceramic honeycomb molded structure, abut on the printed combustible material;

transferring the combustible material to one end face (A) of the ceramic honeycomb molded structure to temporarily seal the through-holes not to be sealed, at their ends;

mounting the ceramic honeycomb molded structure on a member which is capable of covering the end face thereof, so that said temporarily sealed one end face (A) faces upward, and the other end face (B) not sealed, faces downward;

dropping a combustible material which can be burned off, into through-holes other than said temporarily sealed through-holes, from above said one end face (A) of the ceramic honeycomb molded structure, to temporarily seal other through-holes not to be sealed, at their ends, at the other end face (B);

filling a sealant into ends of through-holes to be sealed; and heating and calcining the ceramic honeycomb molded structure temporarily sealed and having the sealant filled as mentioned above, to sinter the sealant and the ceramic honeycomb molded structure and to burn off the combustible material.

* * * * *